United States Patent

Pease

[15] 3,668,541

[45] June 6, 1972

[54] CURRENT COMPENSATOR CIRCUIT

[72] Inventor: Robert A. Pease, Wilmington, Mass.

[73] Assignee: Teledyne, Inc., Los Angeles, Calif.

[22] Filed: Mar. 23, 1970

[21] Appl. No.: 21,736

[52] U.S. Cl. ....................330/23, 330/17, 330/30 R, 330/38 M

[51] Int. Cl. ....................H03f 1/32

[58] Field of Search ....................330/13, 17, 23, 30 D, 38 M

[56] References Cited

UNITED STATES PATENTS

| | | | |
|---|---|---|---|
| 3,457,519 | 7/1969 | Hellstrom | 330/23 X |
| 3,230,468 | 1/1966 | Pearlman | 330/23 |

OTHER PUBLICATIONS

H. W. Parmer– " Two Easy Ways to Stabilize Power-Transistor Hi-Fi Amplifiers," Electronics; Oct. 26, 1962

*Primary Examiner*—Roy Lake
*Assistant Examiner*—Lawrence J. Dahl
*Attorney*—Schiller & Pandiscio

[57] ABSTRACT

A current compensating circuit for compensating a transistor for thermal variations in its operating point. The circuit includes a compensating transistor of the same conductivity type as the transistor to be compensated, the two transistors being thermally matched to one another. The compensating transistor is connected so that it is supplied with a constant electric current and its emitter is direct coupled to the emitter of the transistor to be compensated. A compensating current is provided by a pair of transistors thermally matched to one another and of opposite conductivity type to the first transistors. One of the second pair has its collector connected to the base of the compensating transistor while the other of the second pair has its collector connected to the base of the transistor to be compensated. The current generating transistors have their bases connected to one another and their emitters connected to one another and to the collector of the compensating transistor. The principles are also applicable to a more complex circuit such as a differential amplifier wherein each of the input transistors of the differential amplifier are provided with transistors which provide a thermally variable correction current to the respective bases of the input transistors.

9 Claims, 2 Drawing Figures

ROBERT A. PEASE
INVENTOR.

Schiller & Pandiscio
ATTORNEYS.

CURRENT COMPENSATOR CIRCUIT

This invention relates to transistor circuits, and more particularly to the stabilization of thermally caused variations in transistor characteristics.

It is known that, for a transistor operated in a common-emitter or common-collector configuration, the base current-collector current relationship is at least in part dependent upon thermal variations in collector leakage currents ($I_{CBO}$) and in the D.C. current gain ($h_{FE}$) of the transistor; thus a thermally dependent voltage drop is created by current flowing through resistance in the base circuit of an uncompensated transistor. For a number of well-known reasons, such thermal variations are highly undesirable and a number of approaches have been taken to compensate for thermal instability of the operating point of transistors. One excellent method for compensating a transistor for thermal variations in its operating point is provided by the system described in U.S. Pat. No. 3,230,468 issued Jan. 18, 1966, to A. R. Pearlman. This prior art device uses a compensating transistor of the same conductivity type as the transistor, the operating point of which is to be controlled. The compensating transistor, in conjunction with a constant current source, generates a temperature compensating current in the base of the compensated transistor, In order to limit the currents and establish proper operating voltages, this system uses resistive components of fairly substantial ohmic values.

In the manufacturing of integrated circuits, low values of resistance are desirable, not only because of the difficulty in processing the resistive material onto a chip, but also because the area of the chip used is proportional to the resistance. Thus, high ohmic values of resistance can require an extensive amount of resistive material which, even when deposited as a maze on a chip, unduly enlarges the physical size of the circuit.

A principal object of the present invention is therefore to provide apparatus for readily compensating a transistor for thermal variations in its operating point and not requiring resistive components with comparatively high ohmic values, but only semiconductor devices which do not take up a large amount of area on the integrated circuit chip, and resistors only with low ohmic value, if any. Another object is to provide transistor circuitry for compensating thermal variations in the base current of a transistor in common-collector or common-emitter configuration so that the voltage drop across a base circuit input resistance of the transistor is due substantially only to the input signal.

To affect the foregoing, the present invention provides a thermal-effect compensation circuit for a first transistor, wherein the circuit comprises a source of temperature-variable current which can be driven into the base of the first transistor. Means for providing this current comprises a first compensating transistor of the same conductivity type and thermally matched to the first transistor, a base-collector feedback circuit around the compensating transistor through a third transistor, and a fourth transistor having its base and emitter connected to the base and emitter of the third transistor and its collector connected to the base of the first transistor.

The invention is particularly applicable to compensating a differential amplifier as will be described later.

Other objects of the present invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
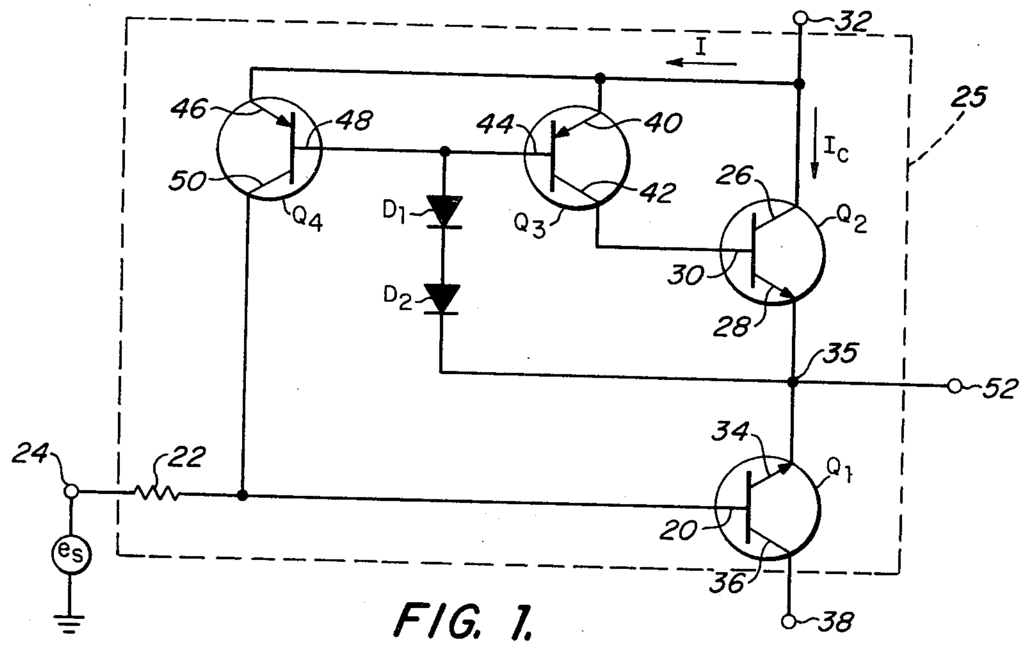
FIG. 1 is a schematic circuit diagram showing a transistor amplifier in emitter-follower configuration compensated with a circuit embodying the principles of the present invention.

Referring now to the drawings wherein like numerals denote like parts, there will be seen in FIG. 1 an amplifying transistor $Q_1$, for example, an npn conductivity type transistor. Transistor $Q_1$ has its base 20 connected to one side of the usual input resistor 22. The other side of resistor 22 is connected to terminal 24 at which an input signal such as $e_s$ is intended to be applied. The circuit of FIG. 1 includes means for compensating transistor $Q_1$ for thermal variations in $I_{CBO}$, $h_{FE}$ and $V_{BE}$. To this end, the circuit includes compensating transistor $Q_2$ of the same conductivity type as transistor $Q_1$. Transistor $Q_2$ is preferably thermally matched to transistor $Q_1$, i.e., so as to exhibit substantially the same type of function with respect to $I_{CBO}$, $h_{FE}$, as well as the base-emitter resistances, over a desired ambient temperature range, for example, between −50° to +130° C. Transistors $Q_1$ and $Q_2$ are disposed so as to be subject to the same ambient temperature, as by being connected to a common heat sink 25. Transistor $Q_2$ includes collector 26, emitter 28 and base 30. A source of substantially constant current is intended to be applied at terminal 32 which is connected directly to collector 26. Circuits which provide constant currents are well known in the art, so need not be described further here. The emitter 34 of transistor $Q_1$ is connected directly to emitter 28 of transistor $Q_2$ at junction 35. However, the circuit may also be arranged with resistors connected between emitter 28 and and junction 35 and between emitter 34 and junction 35. Collector 36 of transistor $Q_1$ is connected to terminal 38 which, for the configuration shown, in operation is maintained at a constant positive voltage inasmuch as transistors $Q_1$ and $Q_2$ are both of npn type. Again, circuits for providing constant value voltages are well known in the art and need not be described further. Transistors $Q_1$ and $Q_2$ may be ordinary transistors or well-known Darlington connection composite transistors.

The circuit thus far described is similar to that set forth in the U.S. Pat. No. 3,230,468. However, in the latter patent the base and collector of transistor $Q_2$ are connected through a feedback circuit to one another, which feedback circuit includes two or more resistors of substantial value coupled to the base of transistor $Q_1$, the base of transistor $Q_2$, and to the collector of transistor $Q_1$. The present invention, however, specifically avoids the use of the resistive components and employs third and fourth transistors $Q_3$ and $Q_4$ respectively, these two transistors being of the same conductivity type as one another and preferably being thermally matched with respect to one another in the same manner as transistors $Q_1$ and $Q_2$ are matched. Transistors $Q_3$ and $Q_4$ need not be especially well matched with respect to $h_{FE}$ since since their bases are connected together, and they are driven with the same voltage. The $I_c$ versus $V_{BE}$ characteristics of transistors $Q_3$ and $Q_4$, however, must match quite closely. Such matching is relatively easy to obtain with integrated circuit transistors grown in close proximity on an integrated circuit chip.

Preferably, transistors $Q_3$ and $Q_4$ are also disposed to be subject to the same ambient temperature, preferably by mounting on the same heat sink as transistors $Q_1$ and $Q_2$. Transistors $Q_3$ and $Q_4$ are of opposite conductivity type to that of transistors $Q_1$ and $Q_2$ and therefore, in the form shown, are pnp transistors. Transistor $Q_3$ is connected with its emitter 40 connected to collector 26 of transistor $Q_2$, collector 42 of transistor $Q_3$ being connected to base 30 of transistor $Q_2$. Emitter 40 and base 44 of transistor $Q_3$ are respectively tied directly to emitter 46 and base 48 of transistor $Q_4$. Collector 50 of transistor $Q_4$ is connected directly to base 20 of transistor $Q_1$.

Normally a constant current is applied to junction 35 and will normally be approximately of twice the value as the constant current applied to terminal 32. This constant current provides constant current to the emitters of transistors $Q_1$ and $Q_2$. Base 44 of transistor $Q_3$ must have some type of connection, such as by some form of resistive means, to the emitters of transistors $Q_1$ and $Q_2$. In the embodiment shown, base 44 of transistor $Q_3$ is connected through a pair of series diodes $D_1$ and $D_2$ to the emitters of transistors $Q_1$ and $Q_2$. The diodes are poled normally to forward bias transistors $Q_3$ and $Q_4$ into a conducting state and establish a loop to apply the correct biases for transistors $Q_1$ and $Q_2$ such that $I_c$ for both $Q_1$ and $Q_2$ is approximately one half of the constant current applied at terminal 52. It will be recognized that transistor $Q_1$ is intended to operate as an emitter follower and therefore output terminal 52 is connected to emitter 34 of transistor $Q_1$.

In operation, current flowing at terminal 32 is provided from a constant current source (not shown) of any of the many-known types. A portion ($I_c$) of this constant current then flows in collector 26 when the collector-emitter circuit of transistor $Q_2$ is properly biased, preferably at a voltage below the level of that at which transistor $Q_2$ saturates. Another portion (I) of this constant current flows through transistors $Q_3$ and $Q_4$. If the gain ($h_{FE}$) of transistor $Q_2$ is high, $I_c$ will be considerably larger than the other current; thermal variations in $h_{FE}$ will be reflected by relatively small proportionate change in $I_c$ (which therefore stays relatively fixed) and a proportionate change in I which may be large. The percentage change in $I_c$ over the entire ambient temperature range will be small even if the percentage change in I is large. The current I is divided and flows through emitters 40 and 46 of transistors $Q_3$ and $Q_4$ respectively. It will be appreciated that the collector current that then flows in transistors $Q_3$ and $Q_4$ is essentially determined by the thermal characteristics of $Q_2$ which, of course, are matched to those of transistor $Q_1$. Because transistors $Q_3$ and $Q_4$ are of opposite conductivity type to transistors $Q_1$ and $Q_2$, the collector current flowing in transistors $Q_3$ and $Q_4$ can readily be established so as to be substantially equal to the temperature-dependent base current ($I_c/h_{FE}I_{cbo}$) which would flow in an uncompensated transistor identical to transistor $Q_1$. The collector current flowing in transistor $Q_1$, with normal base-emitter bias, is equal to the current at terminal 52 less the collector current of $Q_2$ and less the small negligible current flowing through diodes $D_1$ and $D_2$.

It will be seen that any signal input through resistance 22 to base 20 will essentially appear at terminal 52 as in the typical emitter follower; however, the input current which flows through the resistor 22 and the signal source connected at terminal 24 will be quite independent of any thermal changes in the operating characteristics of transistor $Q_1$. Such an emitter follower, of course, will have an extremely high input impedance and very small change of input current versus change of temperature, and therefore would serve admirably as, for example, an isolating buffer.

Figure 2:
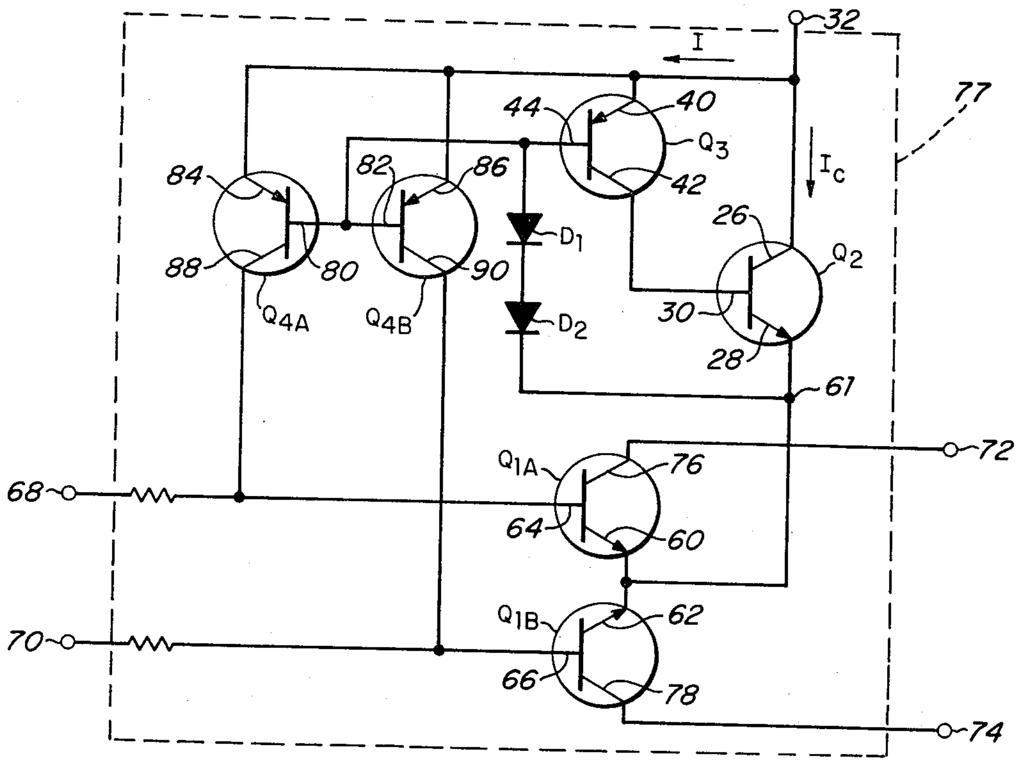
FIG. 2 is a schematic circuit diagram of yet another embodiment of the present invention for compensating transistors in a differential amplifier configuration.

Referring not to the embodiments of the invention shown in FIG. 2, there is shown an application of the principles of the present invention to a differential amplifier. As shown, the differential amplifier includes first and second npn transistors $Q_{1A}$ and $Q_{1B}$ having their respective emitters 60 and 62 connected directly or by resistive means (not shown) to one another. The respective bases, 64 and 66, of transistors $Q_{1A}$ and $Q_{1B}$ are connected to respective input terminals 68 and 70 at which two discrete levels of input signals are intended to be applied through the appropriate input resistors. The latter can obviously be considered to be output impedances of the respective sources of the signals supplied at the input terminals. A pair of output terminals, 72 and 74, are respectively connected to collectors 76 and 78 of transistors $Q_{1A}$ and $Q_{1B}$. As well known in the art, the amplified difference between levels of the signals applied at terminals 68 and 70 is provided across output terminals 72 and 74, while any common mode signal is substantially rejected. Ordinarily, transistors $Q_{1A}$ and $Q_{1B}$ will exhibit variations in their operating point responsibely to thermal changes in their $I_{CBO}$, $h_{FE}$, $V_{BE}$ values.

However, the amplifier shown includes a third or compensating transistor $Q_2$ of the same conductivity type as transistors $Q_{1A}$ and $Q_{1B}$, having its emitter 28 connected directly to the tied emitters of transistors $Q_{1A}$ and $Q_{1B}$ at junction 61 or by resistive means (not shown). For the purposes of the present invention, it is desirable that all three transistors, $Q_{1A}$, $Q_{1B}$, and $Q_2$ be carefully matched to one another with respect to their $I_{CBO}$, $h_{FE}$, $V_{BE}$ characteristics. Transistors $Q_{1A}$, $Q_{1B}$ and $Q_2$ may be ordinary transistors or Darlington connection composite transistors, as are well known in the art.

The device of FIG. 2 also includes three other transistors, $Q_3$, $Q_{4A}$, and $Q_{4B}$. These latter three transistors are all of the same conductivity type opposite to that of $Q_{1A}$, $Q_{1B}$, and $Q_2$. In addition, transistors $Q_3$, $Q_{4A}$, and $Q_{4B}$ are all preferably thermally matched to one another in the same manner as the other three transistors and advantageously all the transistors are mounted on the same heat sink 77. Transistors $Q_3$, $Q_{4A}$ and $Q_{4B}$ need not be especially well matched with respect to $h_{FE}$ since their bases are connected together and then are driven with the same voltage. The $I_c$ versus $V_{BE}$ characteristics of transistors $Q_3$, $Q_{4A}$, and $Q_{4B}$, however, must match quite closely. Such matching is relatively easy to obtain with integrated circuit transistors grown in close proximity on an integrated circuit chip. As in FIG. 1 collector 42 of transistor $Q_3$ is connected to base 30 of transistor $Q_2$. Collector 26 of transistor $Q_2$ is connected to terminal 32 at which a source of constant current is to be applied when the circuit is in operation. A constant current is applied through junction 61 to emitter 28 of transistor $Q_2$, to emitter 60 of transistor $Q_{1A}$ and to emitter 62 of transistor $Q_{1B}$ preferably of a magnitude approximately three times that of the constant current applied at terminal 32. Emitter 40 of transistor $Q_3$ is connected to terminal 32. Base 44 of transistor $Q_3$ must have some type of connection, such as by some form of resistive means, to the emitters of transistors $Q_1$ and $Q_2$. In the embodiment shown, base 44 of transistor $Q_3$ is connected through diodes $D_1$ and $D_2$ in series with one another to emitter 28 of transistor $Q_2$ and therefore also to emitters 60 and 62 of transistors $Q_{1A}$ and $Q_{1B}$ respectively.

Bases 80 and 82 of transistors $Q_{4A}$ and $Q_{4B}$ respectively are connected to base 44 of transistor $Q_3$. Similarly, emitters 84 and 86 of transistors $Q_{4A}$ and $Q_{4B}$ are connected directly to emitter 40 of transistor $Q_3$. Collector 88 of transistor $Q_{4A}$ is connected to base 64 of transistor $Q_{1A}$ while collector 90 of transistor $Q_{4B}$ is connected to the base 66 of transistor $Q_{1B}$.

In operation, transistor $Q_2$ of FIG. 2 functions in substantially the same manner as transistor $Q_2$ of FIG. 1. The flow of current in base 30 produces thermally variable collector currents, substantially identical to one another, flowing in transistors $Q_3$, $Q_{4A}$ and $Q_{4B}$. It will be apparent that the collector currents thus flowing will be of the polarity and of the magnitude necessary to meet the requirement that the collector current of transistor $Q_2$ be of a substantially constant value. Since $I_c$ of transistor $Q_{1A}$ and $I_c$ of transistor $Q_{1B}$ in normal operation are balanced and equal and since the constant current at junction 61 is approximately three times the value of the current at terminal 32, then $I_c$ of each of transistors $Q_{1A}$ and $Q_{1B}$ is approximately equal to $I_c$ of transistor $Q_2$. Thus, in view of the matched thermal characteristics of transistors $Q_{1A}$, $Q_{1B}$, and $Q_2$, the collector currents from transistors $Q_{4A}$ and $Q_{4B}$ will provide the drive base currents respectively for transistors $Q_{1A}$ and $Q_{1B}$. Inasmuch as all of the transistors are subject to the same temperature changes due to their common mounting on a heat sink, the currents driven into the bases of transistors $Q_{1A}$ and $Q_{1B}$ will substantially track the changes that will occur due to thermally variable characteristics of transistors $Q_{1A}$ and $Q_{1B}$. Thus, thermal changes in the characteristics of transistors $Q_{1A}$ and $Q_{1B}$ will not affect the value of the difference signal seen across terminals 72 and 74, nor the current which must be provided into terminals 68 and 70.

What is claimed is:

1. In apparatus for providing compensation of thermally caused variations in the operation of a first transistor adapted to have input signals applied to the base thereof, and including a compensating transistor of the same conductivity type as said first transistor and having thermally variable characteristics substantially matched to the thermally variable characteristics of said first transistor, the emitter-collector circuit of said compensating transistor being connected, to the emitter-collector circuit of said first transistor, means for providing substantially identical currents to said connected emitter-collector circuits, and means for thermally linking said transistors, said apparatus comprising in combination:

transistor means responsive to the base current flowing in said compensating transistor for generating a temperature compensating current and being connected for introducing said temperature compensating current into said base of said first transistor.

2. Apparatus as defined in claim 1 wherein said transistor means comprises third and fourth transistors of opposite conductivity type to said compensating transistor, said third transistor having its collector and emitter respectively connected to the base and collector of said compensating transistor, said fourth transistor having its base and emitter respectively connected to the base and emitter of said third transistor, resistive means connecting the bases of said third and fourth transistors to the emitters of the first and compensating transistors, and means connecting the collector of said fourth transistor to the base of said first transistor.

3. Apparatus as defined in claim 2 wherein said resistive means is comprised of diode means connected between the base of said third transistor and the emitters of said first and compensating transistor, and poled normally for forward biasing the third and fourth transistors into a conducting state.

4. Apparatus for providing compensation of at least a pair of transistors in differential amplifier configuration wherein said pair of transistors have mutually matched thermally variable characteristics and are of like conductivity type, said apparatus also including a compensating transistor of the same conductivity type as said pair of transistors and having thermally variable characteristics matched to track the thermally variable characteristics of said pair of transistors, and a first substantially constant current source connected to the collector of said compensating transistor, the emitters of all of said transistors being coupled to one another and to a second substantially constant current source, in combination fourth, fifth, and sixth transistors of the same conductivity type as one another and of opposite conductivity type to said compensating transistor, all of the bases of said fourth, fifth, and sixth transistors being connected to one another and connected by resistive means to the emitters of said first pair of transistors and said compensating transistors, and all of the emitters of said fourth, fifth, and sixth transistors being connected to one another and to the collector of said compensating transistor, the collector of said fourth transistor being connected to the base of said compensating transistor and the collectors of said fifth and sixth transistors being respectively connected to the bases of said pair of transistors.

5. Apparatus as defined in claim 4 wherein said resistive means is comprised of diode means connected between the coupled emitters of said pair of transistors and the connected bases of said fourth, fifth, and sixth transistors, and being poled for normally biasing said fourth, fifth, and sixth transistors into conduction.

6. Apparatus as defined in claim 2 further including mans for providing a substantially constant current to the emitters of said first and compensating transistors to insure equal bias and operating conditions, said constant current being approximately twice the amplitude of the constant current applied to the collector of said compensating transistor.

7. Apparatus as defined in claim 4 wherein the constant current provided by said second current source is of approximately three times the amplitude as the current provided by said first current source to insure equal bias and operating conditions for each of said first pair of transistors and said compensating transistor.

8. Apparatus as defined in claim 2 wherein both said first and compensating transistors are Darlington connection composite transistors.

9. Apparatus as defined in claim 4 wherein said first pair of transistors and said compensating transistor are Darlington connection composite transistors.

* * * * *